(12) United States Patent
Yin et al.

(10) Patent No.: US 11,477,863 B2
(45) Date of Patent: Oct. 18, 2022

(54) AC ELECTROLUMINESCENT POWER CORD AND DEVICE COMPRISING SAME

(71) Applicant: Zhengkai Yin, Guangdong (CN)

(72) Inventors: Zhengkai Yin, Guangdong (CN); Yongjiang Yin, Guangdong (CN)

(73) Assignee: Zhengkai Yin, Shenzhen (CN)

( * ) Notice: Subject to any disclaimer, the term of this patent is extended or adjusted under 35 U.S.C. 154(b) by 384 days.

(21) Appl. No.: 16/882,394

(22) Filed: May 22, 2020

(65) Prior Publication Data

US 2020/0323052 A1 Oct. 8, 2020

Related U.S. Application Data

(63) Continuation of application No. PCT/CN2017/112689, filed on Nov. 23, 2017.

(51) Int. Cl.
*H05B 44/00* (2022.01)
*H01B 7/00* (2006.01)
*H01B 7/36* (2006.01)
*H01R 13/66* (2006.01)
*H01R 24/28* (2011.01)

(52) U.S. Cl.
CPC ........... *H05B 44/00* (2022.01); *H01B 7/0009* (2013.01); *H01B 7/36* (2013.01); *H01R 13/665* (2013.01); *H01R 24/28* (2013.01)

(58) Field of Classification Search
CPC ........ H05B 44/00; H05B 7/0009; H05B 7/36; H05B 9/005; H01R 13/665; H01R 13/66; H01R 24/28

USPC ......................................................... 315/250
See application file for complete search history.

(56) References Cited

U.S. PATENT DOCUMENTS

| 2004/0144558 | A1* | 7/2004 | Zhengkai | H05B 33/10 174/102 R |
|---|---|---|---|---|
| 2008/0277135 | A1* | 11/2008 | Yin | H01B 7/366 174/108 |
| 2017/0046930 | A1* | 2/2017 | Yin | G08B 7/066 |
| 2017/0130906 | A1* | 5/2017 | Jiang | H01L 33/62 |
| 2017/0211803 | A1* | 7/2017 | Wang | G02F 1/113 |

FOREIGN PATENT DOCUMENTS

| CN | 1933035 A | 3/2007 |
|---|---|---|
| CN | 102956290 A | 3/2013 |
| CN | 103021535 A | 4/2013 |
| CN | 104282381 A | 1/2015 |

(Continued)

*Primary Examiner* — Harshad C Patel

(57) ABSTRACT

An AC electroluminescent power cord includes at least two electrode wires and a luminescent layer. The electrode wire is coated with the luminescent layer; the transparent or translucent plastic layer is coated on an outer wall of the luminescent layer; and each of the at least one electrode wire includes at least one metal wire; the at least two electrode wires are insulated with each other. When the electrode wires are conducted with an AC power source, the luminescent layer emits light. The AC electroluminescent power cord of the disclosure not only has a simple and reliable structure, but also has a display function. When applied for various electronic devices, the AC electroluminescent power cord of the disclosure integrally emits light or sequentially emits light in sections to simulate and display the current flow.

5 Claims, 6 Drawing Sheets

(56) References Cited

FOREIGN PATENT DOCUMENTS

| | | | |
|---|---|---|---|
| CN | 204303384 U | | 4/2015 |
| CN | 205069216 U | | 3/2016 |
| CN | 106982488 A | | 7/2017 |
| CN | 207183711 U | * | 4/2018 |
| CN | 109041354 A | * | 12/2018 |
| DE | 102004021002 A1 | | 11/2005 |

* cited by examiner

AC ELECTROLUMINESCENT POWER CORD AND DEVICE COMPRISING SAME

CROSS-REFERENCE TO RELATED APPLICATIONS

This application is a continuation of International Application No. PCT/CN2017/112689 with a filing date of Nov. 23, 2017. The content of the aforementioned applications, including any intervening amendments thereto, are incorporated herein by reference.

TECHNICAL FIELD

The present application relates to power cords, and more particularly, to an AC electroluminescent power cord and a device comprising the same.

BACKGROUND

The principle of electroluminescence is that the luminescent powder which mainly includes zinc sulfide emits soft light in an alternating current (AC) electromagnetic field with a certain frequency and voltage. According to the principle, electroluminescent sheets and electroluminescent wires appear. The luminescent powder both in the electroluminescent sheet and in the electroluminescent wire emits light in an enclosed electric field between the two electrodes or a coaxial enclosed electric field.

The existing electroluminescent wires are decorative wires which are only capable of emitting light, and have the following disadvantages. It is complex in structure, high in manufacturing cost, unresistant to bending, easy to cause short circuit and single in performance. In addition, it fails to be directly used as an AC power cord.

When the existing power cords of various household appliances are connected to the power supply, whether there is current in the power cord is determined using equipment, such as multimeters, but not visually judged from the appearance thereof.

Therefore, it is necessary to overcome the above-mentioned deficiencies.

SUMMARY

The present disclosure solves the problem that the existing luminescent powder only emits light in a closed coaxial electric field, and provides an AC electroluminescent power cord with a simple structure and a device based on a three-phase AC electroluminescent power cord, where the AC electroluminescent power cord can not only be used as a decorative wire capable of emitting light, but also be directly used for household appliances and industrial devices.

The disclosure provides an AC electroluminescent power cord, comprising:
  at least two electrode wires for generating an open electromagnetic field; and
  a luminescent layer;
  wherein a transparent or translucent plastic layer is coated on an outer wall of the luminescent layer; the luminescent layer is coated on the at least two electrode wires; each of the at least two electrode wires comprises at least one metal wire with the same or approximately the same diameter; wherein the at least two electrode wires are insulated with each other; and when the at least two electrode wires are conducted with an AC power source, the open electromagnetic field is generated around the at least two electrode wires to stimulate the luminescent layer to emit light.

In an embodiment, an insulating material layer is coated on at least one electrode wire of the at least two electrode wires to form an insulated electrode wire.

In an embodiment, the at least two electrode wires are parallel to each other, or stranded to form a cable, or interwound with each other.

In an embodiment, the electrode wires comprise at least two electrode wires; at least one electrode wire of the at least two electrode wires is used as an axis, and the other electrode wires of the at least two electrode wires are spirally wound around the axis;

In an embodiment, the electrode wires comprise at least three electrode wires; at least one electrode wire of the at least three electrode wires is used as an axis, and the other electrode wires of the at least three electrode wires are spirally wound along the axis in opposite directions respectively to form a mesh layer.

The disclosure further provides a device for simulating current flow based on an AC electroluminescent power cord, comprising:
  at least three insulated electrode wires,
  a luminescent layer,
  a transparent or translucent plastic layer,
  a three-way AC output driver, and
  a power plug;
  wherein the at least three insulated electrode wires are stranded to form a cable; the luminescent layer is coated on the cable; the transparent or translucent plastic layer is coated on the luminescent layer; any two adjacent insulated electrode wires form an AC luminescent power cord, and three AC electroluminescent power cords are formed; one end of each of the three AC electroluminescent power cords is connected to three output terminals of the three-way AC output driver, and the other end of each of the three AC electroluminescent power cords is connected to an electronic device; the three output terminals of the three-way AC output driver circularly energize the three AC electroluminescent power cords in a period in turn, in which only one AC electroluminescent power cord of the three AC electroluminescent power cords is energized, and the other AC electroluminescent power cords of the three AC electroluminescent power cords are not energized at the same time, so that the three AC electroluminescent power cords alternately and circularly emit light in a period and then go out.

The disclosure further provides a device for simulating current flow based on an AC electroluminescent power cord, comprising:
  six insulated electrode wires,
  a luminescent layer,
  a transparent or translucent plastic layer,
  a three-way AC output driver, and
  a power plug;
  wherein the six insulated electrode wires comprise a first insulated electrode wire, a second insulated electrode wire, a third insulated electrode wire, a fourth insulated electrode wire, a fifth insulated electrode wire and a sixth insulated electrode wire which are stranded to form a three-phase AC electroluminescent power cord; the luminescent layer is coated on the three-phase AC electroluminescent power cord; the transparent or translucent plastic layer is coated on the luminescent layer;
  the first insulated electrode wire and the second insulated electrode wire form a first luminescent power cord; the third insulated electrode wire and the fourth insulated electrode wire form a second luminescent power cord; the fifth insulated electrode wire and the sixth insulated electrode wire form a third luminescent power cord; one end of the first luminescent power cord, one end of the second luminescent power cord and one end of the third luminescent power cord are respectively connected to three output terminals of the three-way AC output driver, and the other end of the first luminescent power cord, the other end of the second luminescent power cord and the other end of the third luminescent power cord are connected to an electronic device, respectively; and the three-way AC output driver alternately and circularly energizes the first electroluminescent power cord, the second electroluminescent power cord and the third electroluminescent power cord in a period, in which only one AC electroluminescent power cord of the first AC electroluminescent power cord, the second AC electroluminescent power cord and the third AC electroluminescent power cord is energized, and the other AC electroluminescent power cords of the first AC electroluminescent power cord, the second AC electroluminescent power cord and the third AC electroluminescent power cord are not energized at the same time, so that the first AC electroluminescent power cord, the second AC electroluminescent power cord and the third AC electroluminescent power cord alternately and circularly emit light in a period and then go out.

The disclosure further provides a device for simulating current flow based on an AC electroluminescent power cord, comprising:

at least four insulated electrode wires,
a luminescent layer,
a transparent or translucent plastic layer,
a multi-way AC output driver, and
a power plug;

wherein the at least four insulated electrode wires form a three-phase AC electroluminescent power cord;

wherein at least one insulated electrode wire of the at least four insulated electrode wires is used as a neutral wire or a live wire to serve as an axis, and the other insulated electrode wires of the at least four insulated electrode wires are used as live wires or neutral wires, and the other insulated electrode wires of the at least four insulated electrode wires are wound around the axis to form the three-phase AC electroluminescent power cord; or at least three neutral wires have the same number with at least three live wires, and the at least three neutral wires and the at least three live wires are alternately arranged and are stranded to form the three-phase AC electroluminescent power cord;

wherein the luminescent layer is coated on the three-phase AC electroluminescent power cord; the transparent or translucent plastic layer is coated on the luminescent layer; two ends of the three-phase AC electroluminescent power cord are respectively connected to the multi-way AC output driver and the power plug; wherein the neutral wires or the live wires of the three-phase AC electroluminescent power cord are conducted with neutral wires or live wires of a single-phase AC power supply; at least three insulated electrode wires serving as the live wires or the neutral wires are conducted with live wires of the single-phase AC power supply in a period in turn via the multi-way AC output driver, and only one of the at least three insulated electrode wires serving as the live wire or the neutral wire is in a conducting state; the at least three electrode wires wound around the axis are energized in turn, so that the three AC electroluminescent power cords alternately and circularly emit light in a period and then go out. Since the insulated electrode wires are stranded spirally, only luminous segments which move forward sequentially are viewed on an outer surface of the AC electroluminescent power cord in which the insulated electrode wires are stranded from all sides, which visually simulates current flow inside the AC electroluminescent power cord.

In an embodiment, the device comprises at least four insulated electrode wires;

wherein at least one insulated electrode wire of the at least four insulated electrode wires serving as a neutral wire and/or an earth wire is used as an axis, and the other insulated electrode wires of the at least four insulated electrode wires serve as live wires and are wound around the axis to form the three-phase AC electroluminescent power cord; one end of the insulated electrode wires serving as the axis is constantly conducted with a neutral wire or/and an earth wire of a three-phase AC power supply, and the other insulated electrode wires wound around the axis serve as live wires of the three-phase AC power supply; or insulated electrode wires serving as live wires have the same number with insulated electrode wires serving as neutral wires and/or earth wires, and the insulated electrode wires serving as the live wires and the insulated electrode wires serving as the neutral wires or/and the earth wires are alternately arranged and are stranded to form the three-phase AC electroluminescent power cord; and one end of the neutral wire, one end of the earth wire, one end of each of the live wires are indirectly or directly connected to the three-phase AC power supply via an frequency converter, respectively, and the other end of the neutral wire, the other end of the earth wire and the other end of each of the live wires are connected to an electronic device, respectively. When the three-phase AC electroluminescent power cord is energized, the electronic device starts to work, and at the same time, the three-phase AC electroluminescent power cord emits light.

In an embodiment, the device comprises four insulated electrode wires, wherein the four insulated electrode wires are insulated with each other, and a three-phase four-wire AC electroluminescent power cord comprising three live wires and one neutral wire is formed.

In an embodiment, the device comprises five insulated electrode wires; the five insulated electrode wires are insulated with each other, and a three-phase five-wire AC electroluminescent power cord comprising three live wires, one neutral wire and one earth wire is formed.

Compared to the prior art, the disclosure has the following beneficial effects.

The electroluminescent electric wire of the disclosure can be used for both decoration and display. For example, when the single-phase AC luminescent power cord of the disclosure is used as a power cord for various household appliances or devices, it can simulate the lighting of current flow under an action of a multi-way AC output driver, which can not only show the direction of the current flow, but also show the speed of the current flow.

BRIEF DESCRIPTION OF THE DRAWINGS

The present disclosure will be further described in detail below with the accompanying drawings and specific embodiments.

In the drawing.

1, first insulated electrode wire; 101, first core; 102, first insulating layer; 2, second insulated electrode wire; 21, second core; 22, second insulating layer; 3, third insulated electrode wire; 31, third core; 32, third insulating layer; 4, fourth insulated electrode wire; 41, fourth core; 42, fourth insulating layer; 6, luminescent layer; 7, transparent or translucent plastic layer; 8, first electrode wire; 9, second electrode wire; 10, third electrode wire; 11, fourth electrode wire; 19, first power plug; 20, electronic device; 23, multi-way AC output driver; 501, first output terminal of the multi-way AC output driver; 502, second output terminal of the multi-way AC output driver; 503, third output terminal of the multi-way AC output driver; 504, fourth output terminal of the multi-way AC output driver; 24, motor; 109, second power plug; 111, fifth insulated electrode wire; 112, sixth insulated electrode wire; 201, seventh insulated electrode wire; 202, eighth insulated electrode wire; 301, ninth insulated electrode wire; 302, tenth insulated electrode wire; 210, first magnetic line; 211, second magnetic line; 12, first light emitting area; 13, second light emitting area; 14, third light emitting area; 311, first inter-wire light emitting area; 401, second inter-wire light emitting area; 501, third inter-wire light emitting area; 700, three-way AC output driver; 701, first output terminal of the three-way AC output driver; 702, second output terminal of the three-way AC output driver; 703, third output terminal of the three-way AC output driver.

DETAILED DESCRIPTION OF EMBODIMENTS

The present disclosure will be further described in detail below with reference to the accompanying drawings and embodiments.

Embodiment 1

Figure 1:
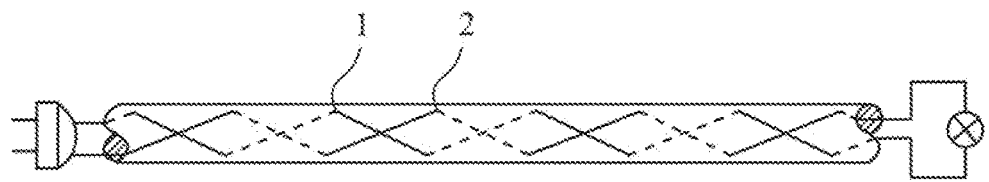
FIG. 1 is a schematic diagram of an AC electroluminescent power cord according to a first implementation in Embodiment 1 of the present disclosure.
Figure 2:
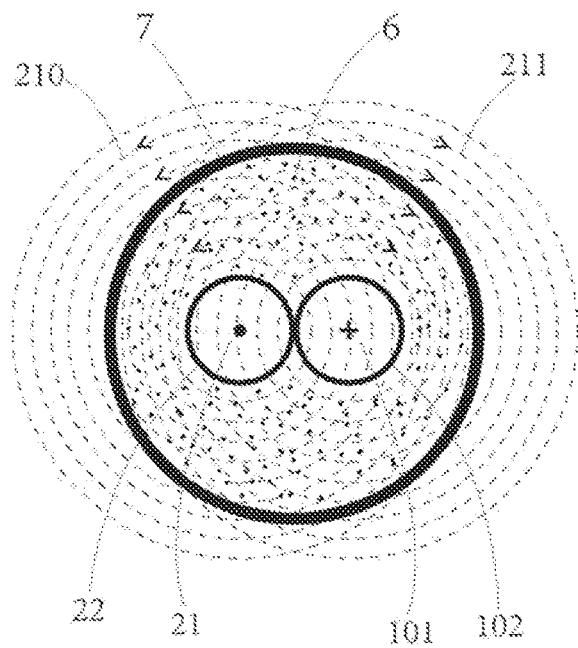
FIG. 2 is a lateral cross-sectional view of the AC electroluminescent power cord according to Embodiment 1 of the present disclosure.
Figure 3:
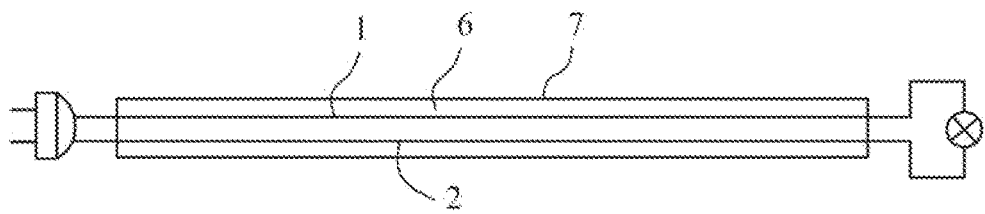
FIG. 3 is a schematic diagram of the AC electroluminescent power cord according to a second implementation in Embodiment 1 of the present disclosure.

As shown in FIGS. 1-3, the embodiment provides an AC electroluminescent power cord, including a transparent or translucent plastic layer 7 and a luminescent layer 6; the luminescent layer 6 is coated on a first insulated electrode wire 1 and a second insulated electrode wire 2; the first insulated electrode wire 1 and the second insulated electrode wire 2 are insulated wires, where the first insulated electrode wire 1 includes a first core 101 and a first insulating layer 102; the first insulating layer 102 is coated on an outer wall of the first core 101; the second insulated electrode wire 2 includes a second core 21 and a second insulating layer 22; the second insulating layer 22 is coated on an outer wall of the second core 21. The first insulated electrode wire 1 and the second insulated electrode wire 2 are parallel to each other as shown in FIG. 3 or are spirally stranded as shown in FIG. 1. The transparent or translucent plastic layer 7 is coated on the luminescent layer 6 to form a single-phase AC electroluminescent power cord, where one end of the single-phase AC electroluminescent power cord is connected to a second power plug 109, and the other end thereof is connected to an electronic device 20. The electronic device 20 is a household appliance or a lamp. When the second power plug 109 is inserted into a household power socket, the single-phase AC electroluminescent power cord is conductive, and the electronic device 20 starts working. Meanwhile, an alternating electromagnetic field is respectively generated around the first core 101 and the second core 21, where a first magnetic line group 210 and a second magnetic line group 211 of the two alternating electromagnetic fields are in opposite directions and form a meshed alternating electromagnetic field, and the luminescent layer 6 is stimulated to emit light in the meshed alternating electromagnetic field formed by the first magnetic line group 210 and the second magnetic line group 211, so that the entire single-phase AC electroluminescent power cord emits light, which shows that the power cord is working.

The first core 101 and the second core 21 in the embodiment both adopt one core. In some embodiments, they may comprise multiple cores, and the cores are preferably metal electrode wires such as copper electrode wires or aluminum electrode wires.

The first insulating layer 102 and the second insulting layer 22 are dielectric insulating material layers. In specific implementation, they may be mainly composed of a polymer binder and any one of barium titanate, barium carbonate and titanium dioxide; or directly formed by applying and drying polyurethane paint or polyester imine paint. The luminescent layer 6 is mainly formed by mixing, coating and drying a polymer binder and electroluminescent powder of zinc sulfide, copper and silicon dioxide, or by mixing, applying and drying the electroluminescent powder of zinc sulfide, copper and silicon dioxide with polyurethane paint or polyester imide paint.

The transparent and translucent plastic layer 7 may be made of fluorescent colored transparent plastic.

Embodiment 2

Figure 4:
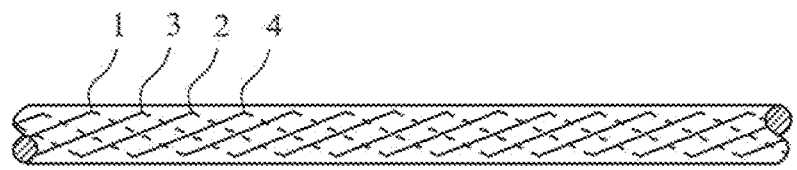
FIG. 4 is a schematic diagram of an AC electroluminescent power cord according to Embodiment 2 of the present disclosure.
Figure 5:
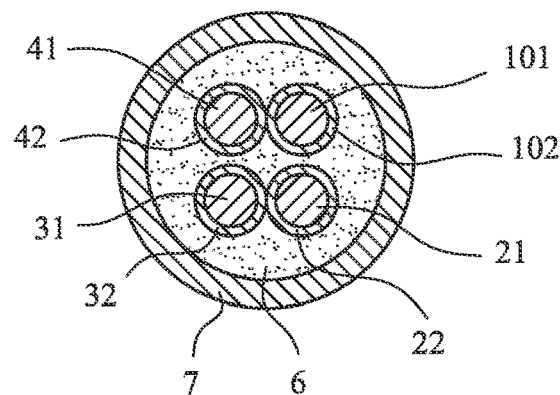
FIG. 5 is a lateral cross-sectional view of the AC electroluminescent power cord according to Embodiment 2 of the present disclosure.

As shown in FIGS. 4-5, based on Embodiment 1, the embodiment provides an AC electroluminescent power cord, including a transparent or translucent plastic layer 7 and a luminescent layer 6. The luminescent layer 6 is coated on a first insulated electrode wire 1, a second insulated electrode wire 2, a third insulated electrode wire 3 and a fourth insulated electrode wire 4 which are insulated enameled wires. The first insulated electrode wire 1 includes a first core 101 and a first insulating layer 102, where the first insulating layer 102 is coated on an outer wall of the first core 101; the second insulated electrode wire 2 includes a second core 21 and a second insulating layer 22, where the second insulating layer 22 is coated on an outer wall of the second core 21; the third insulated electrode wire 3 includes a third core 31 and a third insulating layer 32, where the third insulting layer 32 is coated on an outer wall of the third core 31; and the fourth insulated electrode wire 4 includes a fourth core 41 and a fourth insulating layer 42, where the fourth insulating layer 42 is coated on an outer wall of the fourth core 41. The first insulated electrode wire 1, the third insulated electrode wire 3, the second insulated electrode wire 2 and the fourth insulated electrode wire 4 are spirally and sequentially stranded into a cable.

Specifically, the first, second, third and fourth insulated electrode wires 1-4 can be optionally combined into two, three, or four electroluminescent power cords. The two electrode wires in each electroluminescent power cord are respectively connected to a live wire and a neutral wire of an AC power supply. After the power is conducted, the luminescent layer 6 of the AC electroluminescent power cord is stimulated to emit light, and the luminescent layer 6 is wrapped by the transparent or translucent plastic layer 7, so that the entire AC electroluminescent power cord emits light. The first, second, third and fourth insulated electrode wires 1-4 are optionally combined into different structures, thereby producing different luminous effects.

Embodiment 3

Figure 6:
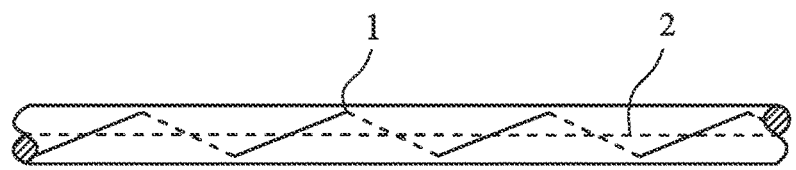
FIG. 6 is a schematic diagram of an AC electroluminescent power cord according to a first implementation in Embodiment 3 of the present disclosure.
Figure 7:
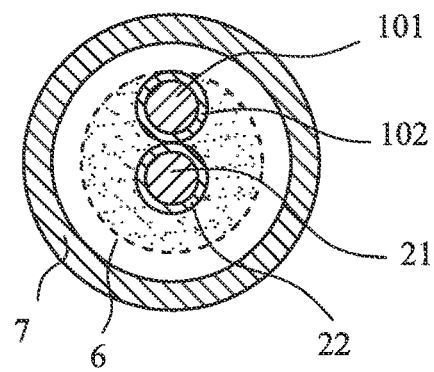
FIG. 7 is a lateral cross-sectional view of the AC electroluminescent power cord according to the first implementation in Embodiment 3 of the present disclosure.

The embodiment provides an AC electroluminescent power cord based on Embodiment 1, where the positions of the insulated electrode wires can be combined as follows:

as shown in FIGS. 6-7, the second insulated electrode wire 2 is horizontally placed approximately at a central axis of the AC electroluminescent power cord, and the first insulated electrode wire 1 is spirally wound on an outer wall of the second insulated electrode wire 2. Specifically, one end of the first insulated electrode wire 1 in the AC electroluminescent power cord is connected to a live wire of the AC electroluminescent power cord via a second power plug 109, and the other end thereof is connected to an electronic device 20; one end of the second insulated electrode wire 2 in the AC electroluminescent power cord is connected to a neutral wire of the AC electroluminescent power cord via the second power plug 109, and the other end thereof is connected to the electronic device 20.

Figure 8:
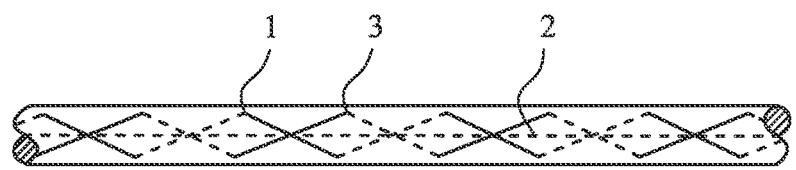
FIG. 8 is a schematic diagram of another AC electroluminescent power cord according to a second implementation in Embodiment 3 of the present disclosure.
Figure 9:
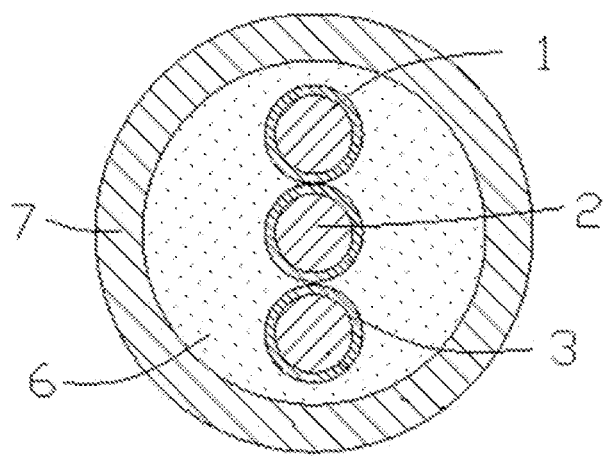
FIG. 9 is a lateral cross-sectional view of the AC electroluminescent power cord according to the second implementation in Embodiment 3 of the present disclosure.
Figure 10:
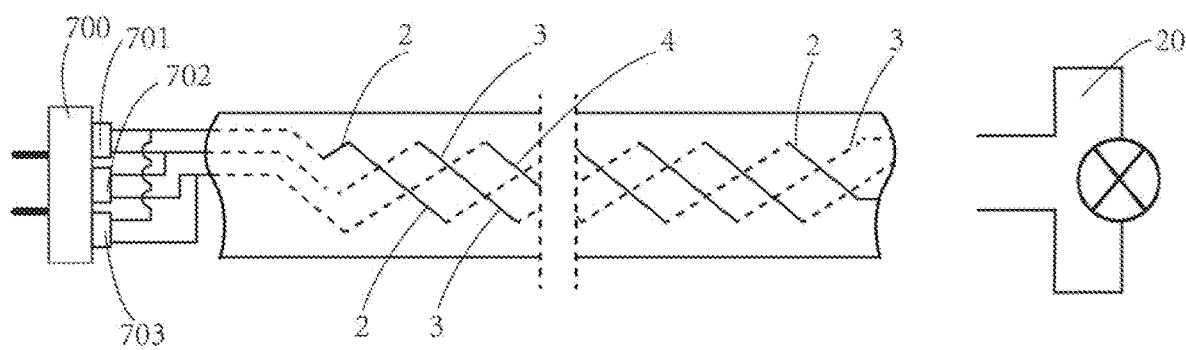
FIG. 10 is a schematic diagram of a device for simulating current flow based on an AC electroluminescent power cord according to Embodiment 4 of the present disclosure.
Figure 11:
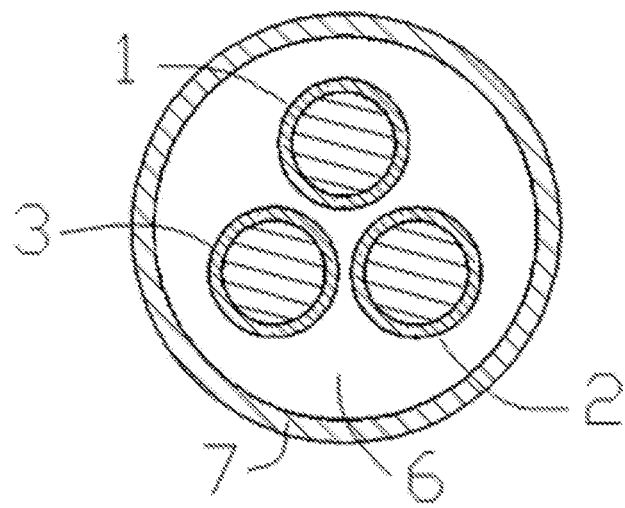
FIG. 11 is a lateral cross-sectional view of the device according to Embodiment 4 of the present disclosure.

The positions of the insulated electrode wires can also be combined as follows: as shown in FIGS. 8-9, the AC electroluminescent power cord comprises first, second and third insulated electrode wires 1-3, where the second insulated electrode wire 2 is horizontally placed approximately at a central axis of the AC electroluminescent power cord, and the first insulated electrode wire 1 and the third insulated electrode wire 3 are spirally wound on an outer wall of the second insulated electrode wire 2; meanwhile, the first insulated electrode wire 1 and the third insulated electrode wire 3 are respectively spirally wound in opposite directions to form a mesh layer. In some embodiments, the first insulated electrode wire 1 and the third insulated electrode wire 3 can also spirally wound in the same direction. As shown in FIG. 10, the first, second and third insulated electrode wires 1-3 can be combined as follows: the first, second and third insulated electrode wires form a structure which has a triangular cross-section, and are spirally stranded into a cable; specifically, one end of any one of the first, second and third insulated electrode wires in the AC electroluminescent power cord is connected to an earth wire of the AC power supply, and the other end thereof is connected to the electronic device 20; and one end of the other two insulated electrode wires are respectively connected to a live wire and a neutral wire of the AC power supply, and the other end thereof is connected to the electronic device 20.

When the AC electroluminescent power cord is specifically in use, after being connected to the AC power supply, the luminescent layer 6 is stimulated to emit light, and the transparent or translucent layer 7 is coated on the luminescent layer 6.

Embodiment 4

As shown in FIGS. 10-14, the embodiment provides a device for simulating current flow based on an AC electroluminescent power cord, and the device includes at least three insulated electrode wires 2-4, a three-way AC output driver 700, a luminescent layer 6, and a transparent or translucent plastic layer 7, where the at least three insulated electrode wires 2-4 are stranded into a cable; the luminescent layer 7 is coated on the cable stranded by the three insulated electrode wires 2-4; the transparent or translucent plastic layer 7 is coated on the luminescent layer 6; two adjacent insulated electrode wires (i.e., the second insulated electrode wire 2 and the third insulated electrode wire 3; the third insulated electrode wire 3 and the fourth insulated electrode wire 4; the fourth insulated electrode wire 4 and the second insulated electrode wire 2) form three AC electroluminescent power cords in turn. One end of each of the three AC electroluminescent power cords is respectively connected to three output terminals 701-703 of the three-way AC output driver 700, and the other end of each of the three AC electroluminescent power cords is connected to the electronic device 20. The three-way AC output driver circularly turns on and turns off the three AC electroluminescent power cords in a period in turn, so that the three AC electroluminescent power cords alternately and circularly emit light in a period and then go out.

Figure 12:
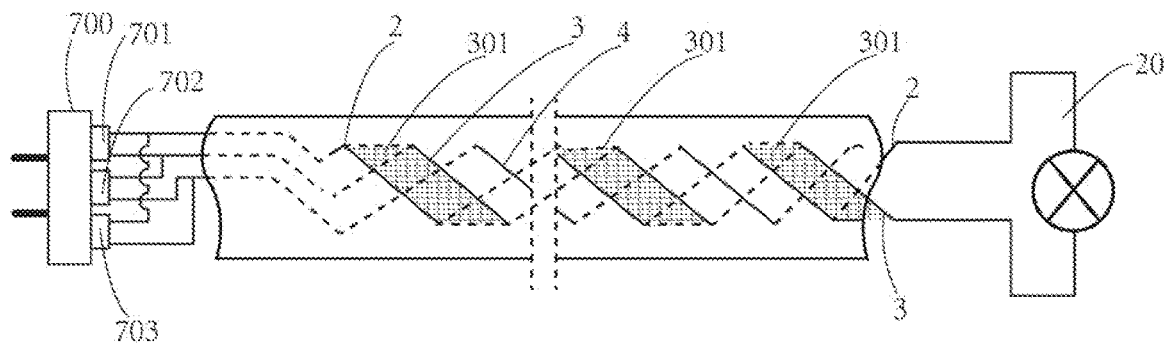
FIG. 12 is a diagram showing a first light emitting state for simulating current flow of the device according to Embodiment 4 of the present disclosure.
Figure 13:
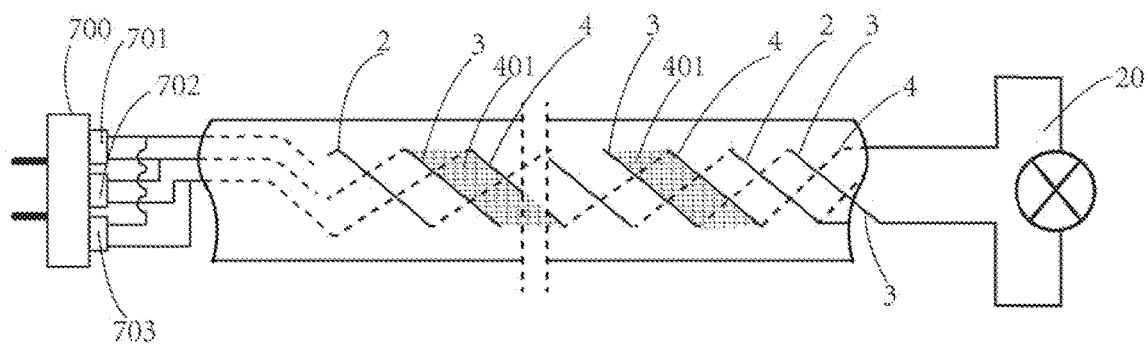
FIG. 13 is a diagram showing a second light emitting state for simulating current flow of the device according to Embodiment 4 of the present disclosure.
Figure 14:
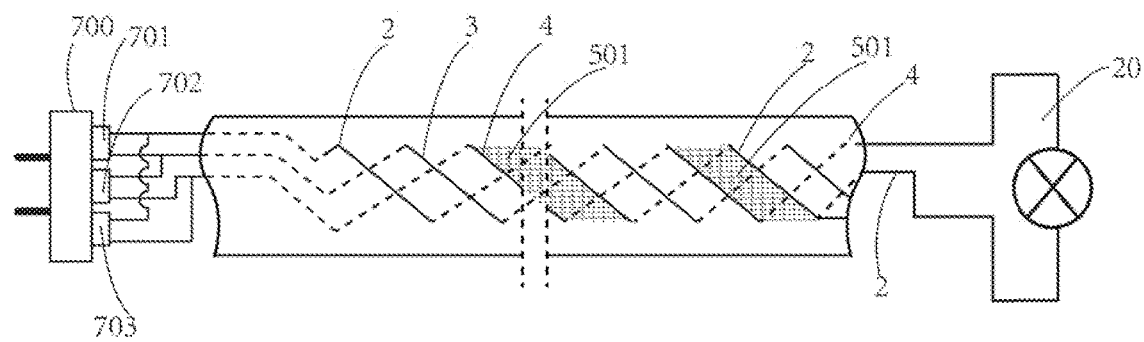
FIG. 14 a diagram showing a third light emitting state for simulating current flow of the device according to Embodiment 4 of the present disclosure.
Figure 15:
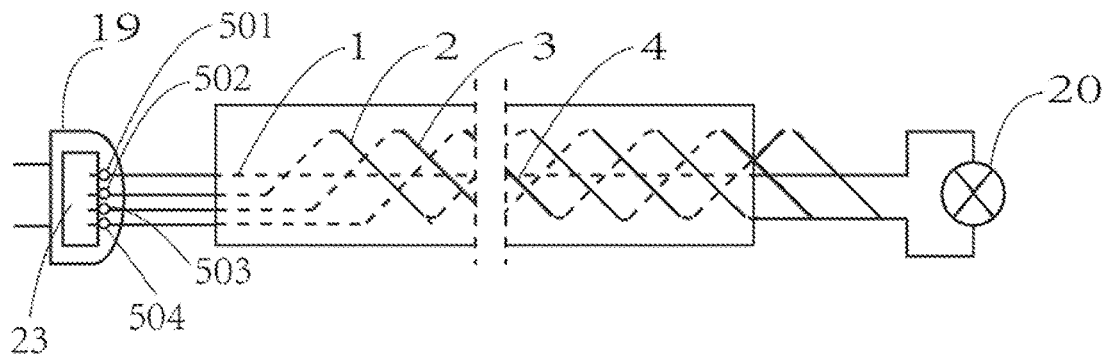
FIG. 15 is a schematic diagram of a device for simulating current flow based on an AC electroluminescent power cord according to Embodiment 5 of the present disclosure.
Figure 16:
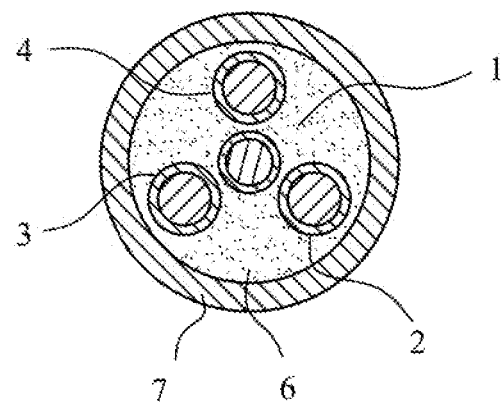
FIG. 16 is a lateral cross-sectional view of the device according to Embodiment 5 of the present disclosure.

As shown in FIG. 12, under the driving of the three-way AC output driver 700, the second insulated electrode wire 2 and the third insulated electrode wire 3 are turned on to emit light, and a first inter-wire light emitting area 311 between the second insulated electrode wire 2 and the third insulated electrode wire 3 emits light in a period and then goes out instantly; and then the third insulated electrode wire 3 and the fourth insulated electrode wire 4 are turned on to emit light, and a second inter-wire light emitting area 401 between the third insulated electrode wire 3 and the fourth insulated electrode wire 4 emits light in a period and then goes out instantly, as shown in FIG. 13; and then the fourth insulated electrode wire 4 and the second insulated electrode wire 2 are turned on to emit light, and a third inter-wire light emitting area 501 between the fourth insulated electrode wire 4 and the second insulated electrode wire 2 emits light in a period and then goes out instantly, as shown in FIG. 14. In this way, the conducting of the insulated electrode wires 2-4 cycles in a period in turn. Since the insulated electrode wires are stranded spirally, only luminous segments which move forward sequentially are viewed on an outer surface of the AC electroluminescent power cord in which the insulated electrode wires are stranded from all sides, which visually simulates current flow inside the AC electroluminescent power cord.

Embodiment 5

As shown in FIGS. 15-19, the embodiment provides a device for simulating current flow based on an AC electroluminescent power cord, including a first power plug 19, a multi-way AC output driver 23 and four insulated electrode wires 1-4, where one insulated electrode wires 1 is used as a neutral wire, and the other insulated electrode wires 2-4 are used as live wires; and the live wires are wound around the neutral wire to form a cable. The luminescent layer 6 is coated on the cable stranded by the four insulated electrode wires; and the transparent or translucent plastic layer 7 is coated on the luminescent layer 6. One end of the single-phase AC electroluminescent power cord is connected to the multi-way AC output driver 23 and the first power plug 19. The first insulated electrode wire 1 serving as a neutral wire and a first output terminal 501 of the multi-way AC output driver 23 are constantly conducted, and the second, third and fourth insulated electrode wires 2, 3, 4 serving as live wires are respectively connected to the second, third and fourth output terminals 502, 503, 504 of the multi-way AC output driver 23; and the other end of each of the insulated electrode wires 1-4 is connected to the electronic device. The three insulated electrode wires 2-4 are connected to a live wire of the single-phase AC power supply in a period in turn, so that only one of the insulated electrode wires which serve as the live wire is in a conducting state. The three insulated electrode wires 2-4 stranded on the central axis are turned on and turn off in turn (i.e., the first insulated electrode wire 1 and the second insulated electrode wire 2 which form a first AC electroluminescent power cord are conductive at the same time, or the first insulated electrode wire 1 and the third insulated electrode wire 3 which form a second AC electroluminescent power cord are conductive at the same time, or the first insulated electrode wire 1 and the fourth insulated electrode wire 4 which form a third AC electroluminescent power cord are conductive at the same time), so that the first, second and third AC electroluminescent power cords alternately and circularly emit light in a period and then go out.

Figure 17:
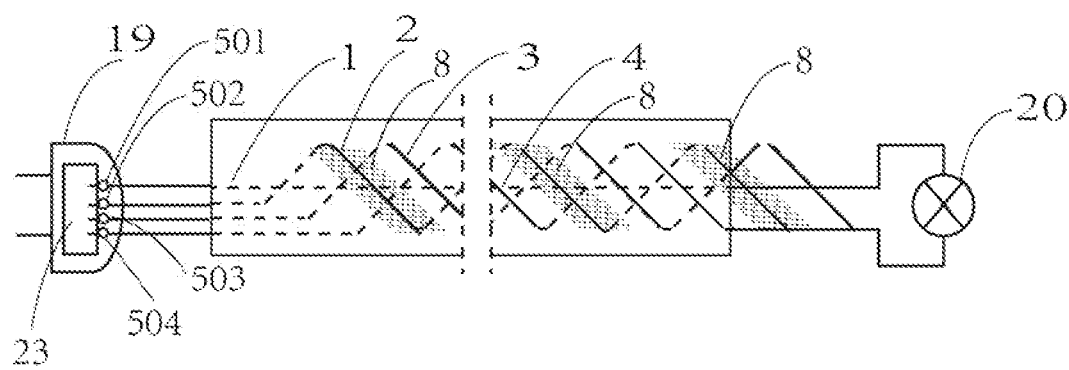
FIG. 17 a diagram showing a first light emitting state for simulating current flow of the device according to Embodiment 5 of the present disclosure.
Figure 18:
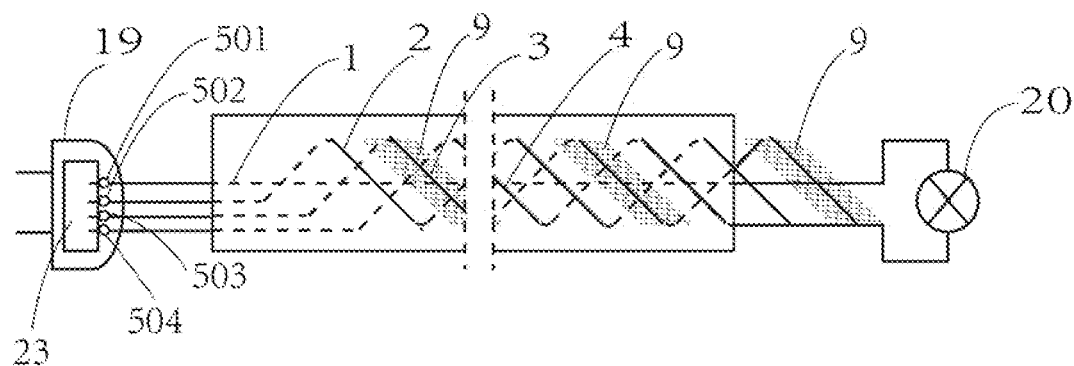
FIG. 18 a diagram showing a second light emitting state for simulating current flow of the device according to Embodiment 5 of the present disclosure.
Figure 19:
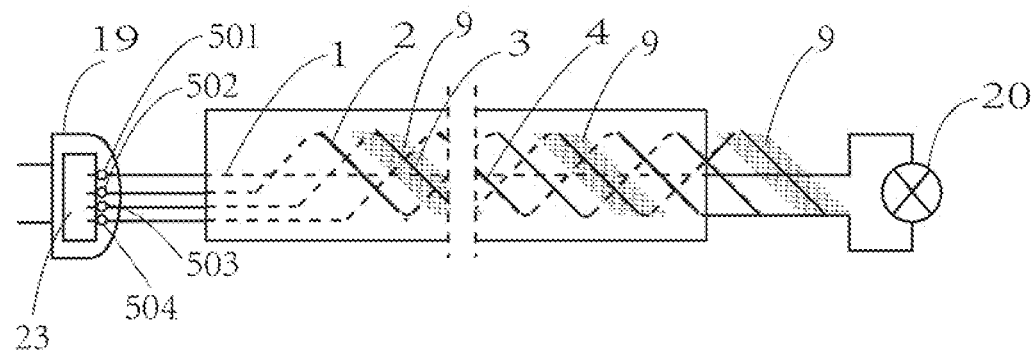
FIG. 19 a diagram showing a third light emitting state for simulating current flow of the device according to Embodiment 5 of the present disclosure.

As shown in FIG. 17, under the driving of the three-way AC output driver 23, the first insulated electrode wire 1 and the second insulated electrode wire 2 are turned on to emit light, and a first light emitting area 12 between the first insulated electrode wire 1 and the second insulated electrode wire 2 emits light in a period and then goes out instantly; and then the first insulated electrode wire 1 and the third insulated electrode wire 3 are turned on to emit light, and a second light emitting area 13 between the first insulated electrode wire 1 and the third insulated electrode wire 3 emits light in a period and then goes out instantly, as shown in FIG. 18; and then the first insulated electrode wire 1 and the fourth insulated electrode wire 4 are turned on to emit light, and a third light emitting area 14 between the first insulated electrode wire 1 and the fourth insulated electrode wire 4 emits light in a period and then goes out instantly, as shown in FIG. 19. In this way, the insulated electrode wires 2-4 cycles in a period in turn. Since the insulated electrode wires are stranded spirally, only luminous segments which move forward sequentially are viewed on an outer surface of the AC electroluminescent power cord in which the insulated electrode wires are stranded from all sides, which visually simulates current flow inside the AC electroluminescent power cord.

As shown in FIGS. 15-19, in this embodiment, in the three-phase AC electroluminescent power cord for simulating current flow, any one of the insulated electrode wires can be served as the neutral wire, and the other insulated electrode wires are served as the live wires, which does not affect the luminous effect showing the current flow.

Embodiment 6

Figure 20:
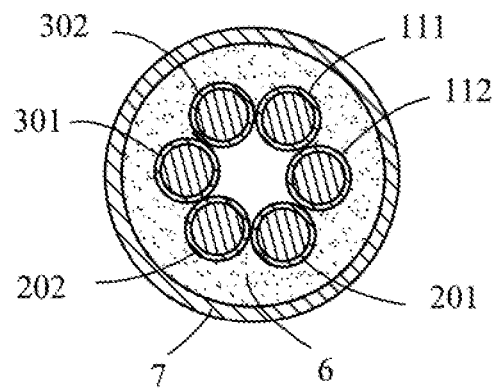
FIG. 20 is a lateral cross-sectional view of a device for simulating current flow based on an AC electroluminescent power cord according to Embodiment 6 of the present disclosure.

Based on the above-mentioned embodiments, the embodiment provides a device for simulating current flow based on an AC electroluminescent power cord, including at least six insulated electrode wires, where three neutral wires and three live wires are sequentially stranded into a cable, as shown in FIG. 20. The six insulated electrode wires 111, 112, 201, 202, 301 and 302 include three neutral wires and three live wires which are alternately arranged and sequentially stranded into a cable; the insulated electrode wires which are stranded into the cable are coated with a luminescent layer and a transparent or translucent layer in turn to form an AC electroluminescent power cord; the above six insulated electrode wires form three AC electroluminescent power cords (i.e., the fifth insulated electrode wire 111 and the sixth insulated electrode wire 112 form a first AC electroluminescent power cord, the seventh insulated electrode wire 201 and the eighth insulated electrode wire 202 form a second AC electroluminescent power cord, the ninth insulted electrode wire 301 and the tenth insulated electrode wire 302 form a third AC electroluminescent power cord). One end of the three AC electroluminescent power cords is respectively connected to three output terminals 701-703 of the three-way AC output driver 700, and the other end thereof is respectively connected to the electronic device 20. The three-way AC output driver 700 circularly turns on and turns off the three AC electroluminescent power cords in a period, so that the three AC electroluminescent power cords alternately and circularly emit light in a period and then go out. Since the insulated electrode wires are stranded spirally, only luminous segments which move forward sequentially are viewed on an outer surface of the AC electroluminescent power cord in which the insulated electrode wires are stranded from all sides, which visually simulates current flow inside the AC electroluminescent power cord.

As shown in FIG. 20, in this embodiment, in the three-phase AC electroluminescent power cord for simulating current flow, any one of the insulated electrode wires can be served as the neutral wire, and the other insulated electrode wires are served as the live wires, which does not affect the luminous effect showing the current flow.

Embodiment 7

Figure 21:
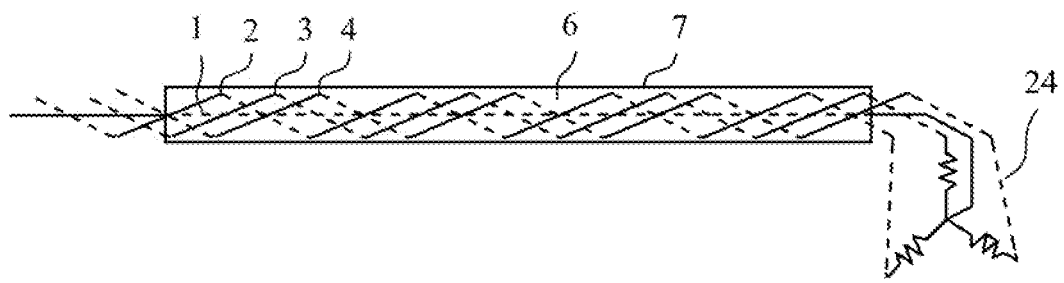
FIG. 21 is a schematic diagram of an AC electroluminescent power cord according to Embodiment 7 of the present disclosure.

As shown in FIG. 21, the embodiment provides a three-phase four-wire AC electroluminescent power cord based on Embodiment 1, which is usually used as an industrial power cord. In the embodiment, a first insulated electrode wire 1 is used as an axis, and second, third and fourth insulated electrode wires 2-4 are spirally wound around the first insulated electrode wire 1 in turn, which are wrapped by a luminescent layer 6 and a transparent or translucent plastic layer 7 in turn. Specifically, the first insulated electrode wire 1 is used as a neutral wire; the second insulated electrode wire 2 is used as an x-phase; the third insulated electrode wire 3 is used as a y-phase; and the fourth insulated electrode wire 4 is used as a z-phase. One end of the electroluminescent power cord is directly connected to a three-phase four-wire power supply, or indirectly connected to the three-phase four-wire power supply via a frequency converter; and the other end thereof is connected to an electronic device, such as a three-phase four-wire motor 24, so that the luminescent layer 6 emits light during use. When the electroluminescent power cord is connected to the three-phase four-wire power supply via the frequency converter, its luminous brightness will change with the frequency of the frequency converter. The higher the frequency is, the higher the brightness is. Thus, the change in the speed of the motor 24 can be judged through the change of the brightness of the electroluminescent power cord. The three-phase four-wire AC electroluminescent power cord in the embodiment can also be replaced with a three-phase three-wire AC electroluminescent power cord or a three-phase five-wire AC electroluminescent power cord, and the three-phase four-wire power supply can also be replaced with the three-phase power supply, such as a three-phase three-wire power supply or a three-phase five-wire power supply. The motor 24 can be a star motor, or a delta motor. The device for simulating current flow based on the three-phase AC electroluminescent power cord used in industrial equipment simply judges the change of a speed of the electric equipment such as the motor 24 through the change of the brightness of the electroluminescent power cord, which cannot be achieved by the existing AC electroluminescent power cords and ordinary power cords.

It should be understood that those of ordinary skill in the art can make improvements or changes based on the above description, and all such improvements and changes should fall within the protection scope of the appended claims of the present disclosure.

The AC electroluminescent power cord of the present disclosure can be applied as a or a part of power supply wire of various electronic devices, equipment for observation and indication.

Described above are only preferred embodiments of the disclosure, which are not intended to limit the invention. Any improvement made based on concept and technical scheme of the disclosure, or any application of the concept and technical scheme of the disclosure in other fields without any improvement should fall within the scope of the present disclosure defined by the appended claims.

What is claimed is:

1. A device for simulating current flow based on an AC electroluminescent power cord, comprising:
   six insulated electrode wires,
   a luminescent layer,
   a transparent or translucent plastic layer,
   a three-way AC output driver, and
   a power plug;
   wherein the six insulated electrode wires comprise a first insulated electrode wire, a second insulated electrode wire, a third insulated electrode wire, a fourth insulated electrode wire, a fifth insulated electrode wire and a sixth insulated electrode wire which are stranded to form a three-phase AC electroluminescent power cord; the luminescent layer is coated on the three-phase AC electroluminescent power cord; the transparent or translucent plastic layer is coated on the luminescent layer;
   the first insulated electrode wire and the second insulated electrode wire form a first luminescent power cord; the third insulated electrode wire and the fourth insulated electrode wire form a second luminescent power cord; the fifth insulated electrode wire and the sixth insulated electrode wire form a third luminescent power cord; one end of the first luminescent power cord, one end of the second luminescent power cord and one end of the third luminescent power cord are respectively connected to three output terminals of the three-way AC output driver, and the other end of the first luminescent power cord, the other end of the second luminescent power cord and the other end of the third luminescent power cord are connected to an electronic device, respectively; and
   the three-way AC output driver alternately and circularly energizes the first electroluminescent power cord, the second electroluminescent power cord and the third electroluminescent power cord in a period, in which only one AC electroluminescent power cord of the first AC electroluminescent power cord, the second AC electroluminescent power cord and the third AC electroluminescent power cord is energized, and the other AC electroluminescent power cords of the first AC electroluminescent power cord, the second AC electroluminescent power cord and the third AC electroluminescent power cord are not energized at the same time, so that the first AC electroluminescent power cord, the second AC electroluminescent power cord and the third AC electroluminescent power cord alternately and circularly emit light in a period and then go out.

2. A device for simulating current flow based on an AC electroluminescent power cord, comprising:
   at least four insulated electrode wires,
   a luminescent layer,
   a transparent or translucent plastic layer,
   a multi-way AC output driver, and
   a power plug;
   wherein the at least four insulated electrode wires form a three-phase AC electroluminescent power cord;
   wherein at least one insulated electrode wire of the at least four insulated electrode wires is used as a neutral wire or a live wire to serve as an axis, and the other insulated electrode wires of the at least four insulated electrode wires are used as live wires or neutral wires, and the other insulated electrode wires of the at least four insulated electrode wires are wound around the axis to form the three-phase AC electroluminescent power cord; or at least three neutral wires have the same number with at least three live wires, and the at least three neutral wires and the at least three live wires are alternately arranged and are directly stranded to form the three-phase AC electroluminescent power cord;

wherein the luminescent layer is coated on the three-phase AC electroluminescent power cord; the transparent or translucent plastic layer is coated on the luminescent layer; two ends of the three-phase AC electroluminescent power cord are respectively connected to the multi-way AC output driver and the power plug; wherein the neutral wires or the live wires of the three-phase AC electroluminescent power cord are conducted with neutral wires or live wires of a single-phase AC power supply; at least three insulated electrode wires serving as the live wires or the neutral wires are conducted with live wires of the single-phase AC power supply in a period in turn via the multi-way AC output driver, and only one of the at least three insulated electrode wires serving as the live wire or the neutral wire is in a conducting state.

3. The device of claim 2, comprising at least four insulated electrode wires;

wherein at least one insulated electrode wire of the at least four insulated electrode wires serving as a neutral wire and/or an earth wire is used as an axis, and the other insulated electrode wires of the at least four insulated electrode wires serve as live wires and are wound around the axis to form the three-phase AC electroluminescent power cord; one end of the insulated electrode wires serving as the axis is constantly conducted with a neutral wire or/and an earth wire of a three-phase AC power supply, and the other insulated electrode wires wound around the axis serve as live wires of the three-phase AC power supply; or insulated electrode wires serving as live wires have the same number with insulated electrode wires serving as neutral wires and/or earth wires, and the insulated electrode wires serving as the live wires and the insulated electrode wires serving as the neutral wires or/and the earth wires are alternately arranged and are stranded to form the three-phase AC electroluminescent power cord; and one end of the neutral wire, one end of the earth wire, one end of each of the live wires are indirectly or directly connected to the three-phase AC power supply via an frequency converter, respectively, and the other end of the neutral wire, the other end of the earth wire and the other end of each of the live wires are connected to an electronic device, respectively.

4. The device of claim 3, comprising four insulated electrode wires, wherein the four insulated electrode wires are insulated with each other, and a three-phase four-wire AC electroluminescent power cord comprising three live wires and one neutral wire is formed.

5. The device of claim 3, comprising five insulated electrode wires, wherein the five insulated electrode wires are insulated with each other, and a three-phase five-wire AC electroluminescent power cord comprising three live wires, one neutral wire and one earth wire is formed.

* * * * *